W. L. HARVEY.
RESILIENT TIRE.
APPLICATION FILED MAY 31, 1917.
1,265,909.
Patented May 14, 1918.
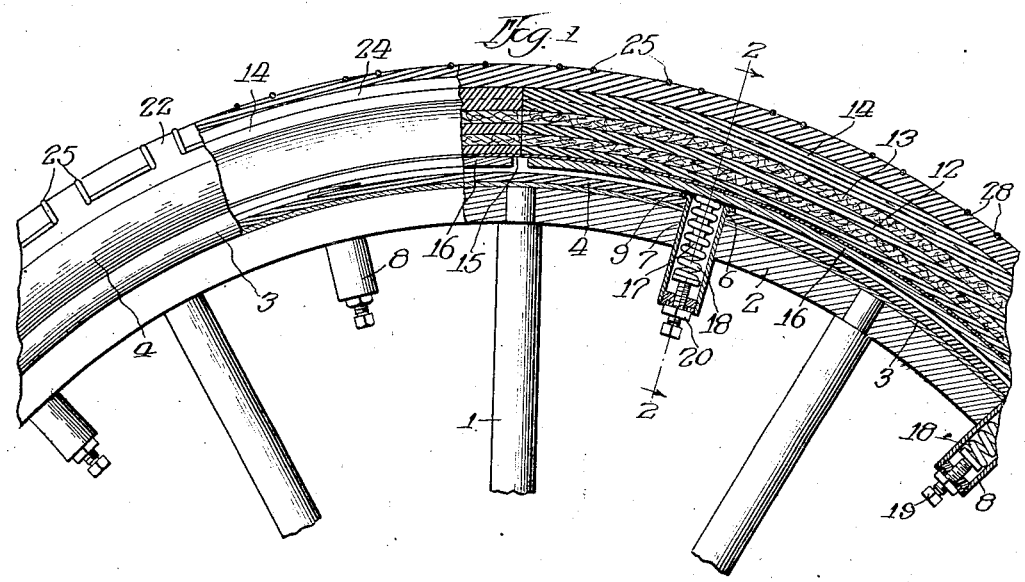
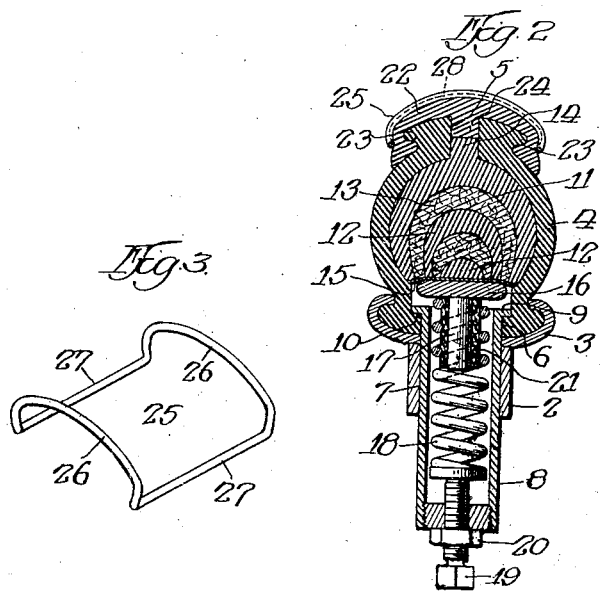
WITNESS
INVENTOR.
William L. Harvey.
By George Bayard Jones
ATTORNEY

UNITED STATES PATENT OFFICE.

WILLIAM L. HARVEY, OF CHICAGO, ILLINOIS, ASSIGNOR TO HARVEY TIRE AND RUBBER COMPANY, OF CHICAGO, ILLINOIS, A CORPORATION OF MAINE.

RESILIENT TIRE.

1,265,909. Specification of Letters Patent. Patented May 14, 1918.

Application filed May 31, 1917. Serial No. 171,824.

*To all whom it may concern:*

Be it known that I, WILLIAM L. HARVEY, a citizen of the United States, residing at Chicago, in the county of Cook and State of Illinois, have invented a certain new and useful Improvement in Resilient Tires, of which the following is a full, clear, concise, and exact description.

This invention relates to improvements in tires and more particularly to resilient puncture proof tires of the type adapted for use on motor vehicles.

As is well known, many difficulties are encountered in the use of the ordinary inner tube pneumatic tires of the type now commonly used on automobiles, such difficulties being attributable largely to blow-outs caused by the deterioration of the outer casing of the tire or to punctures encountered during the travel of the vehicle over the road, and also to the subsequent hardships which accompany the removal of the tire from the wheel of the vehicle after the same has become deflated due to such punctures or blow-outs.

The present invention aims to overcome these various difficulties and disadvantages and has for one of its objects to provide an automobile tire which shall be puncture proof and which shall have all of the resilient qualities of a pneumatic tire. Another object of the invention is the provision of a puncture proof tire of the type described which may be readily and quickly applied to the various forms of rims now extensively used on automobile wheels without modifying or in any way changing the construction of the same. A further object of the invention resides in the provision of novel means adapted to retain a detachable tread in position on the outer casing of the tire, said means acting to increase the tractive efforts of the tire and also serving as an effective non-skid armor for said tire.

Other objects and advantages will be apparent from the following description taken in connection with the accompanying drawings wherein the preferred embodiment of the invention is illustrated.

Figure 1 is a fragmentary side elevation of an automobile wheel provided with a tire constructed in accordance with the present invention, said tire being shown partly in section.

Fig. 2 is a vertical sectional view taken on the line 2—2 of Fig. 1.

Fig. 3 is a perspective view of one of the tread retaining spring clips.

Referring more in detail to the drawings, an automobile wheel of any preferred construction is illustrated at 1 and is shown provided with the usual felly 2 and rim 3, said rim being of the clencher type such as is used in automobile wheel construction. It will be readily understood from the following, however, that the rim may be of any preferred type, the tire herein described being adapted to fit any of the rims now used.

Held firmly by the flanges of the rim 3 in the usual manner, is the outer casing 4 of the tire which is preferably split around its outer circumference as shown at 5. The inner circumference of said tire is continuous except for openings 6 which are positioned at intervals therearound, as shown in Fig. 1, said openings being adapted to coincide with suitable holes 7 bored through the rim 3 and felly 2 of the wheel. Adapted to project radially through these alined openings in the direction of the hub of the wheel are a plurality of barrels 8 flanged at their inner ends as at 9, said flanges being adapted to engage shoulders 10 formed on the inside of the tire to thereby further clamp said tire firmly into position on the rim 3.

The casing 4 of the tire is provided with a suitable cushioning core 11 shown in the drawings as composed of alternate layers of spongy rubber 12 and felt 13. The last layer of said core 11, or, the layer positioned adjacent the inner surface of the casing 4, is provided with a tongue 14 adapted to project upwardly between the adjacent edges of the casing 4 substantially as shown in Fig. 2. The core 11 is preferably formed in sections in order that the same may be readily positioned within the casing 4 of the tire. Covering the inner face of the sections composing the core 11 and adapted to protect the same against undue wear and injury is a suitable strip of fabric 15. Bearing against this strip of fabric 15 and against said sections of the core 11 are a plurality of metal bars 16 provided with depending pins 17 adapted to project within the barrels 8. Positioned within the barrels 8 and abutting against the bars 16 and surrounding the pins 17 are coiled springs 18, the tension of said springs being adjustable by means of set screws 19 projecting into said barrels 8 through plugs screw-threaded in the outer ends of said barrels. These set screws 19 are provided with suitable lock nuts 20 adapted to retain said screws 19 in their predetermined adjusted positions. It is preferred to surround each of the pins 17 with a rubber or fabric casing 21 which is adapted to fit snugly between said pin and the inner surface of the coiled spring surrounding the same to prevent undue wear and to also provide means whereby the coöperation between said pins and said springs is rendered noiseless.

The outer casing 4 is provided around its outer circumference with a suitable detachable tread 22, having an interlocking engagement with said casing on either side thereof, as at 23, and being further provided with a depending tongue 24 adapted to project into the split portion of said outer casing and to abut against the upwardly projecting tongue 14 of the core 11 substantially as shown in Fig. 2. As a further means of fastening the tread 22 securely to the outer casing 4, spring clips 25 are provided and adapted to clamp said tread in firm frictional engagement therewith. These clips are shown comprising a plurality of transverse bars 26 and longitudinal bars 27, the longitudinal bars 27 of said clips being drawn tightly against the sides of the tread 22 substantially as shown in Fig. 1 by reason of the tension exerted thereon by the transverse bars 26 when said clip is sprung into position. If desired, suitable grooves 28 may be provided in the outer surface of the tread 22 in order to provide means whereby said clips are prevented from creeping around the tread when the tire is in motion. It will be noted that these clips not only serve as effective means for clamping the tread firmly to the outer casing, but also act in the capacity of non-skid devices.

It is obvious from the above that a tire has been provided which is puncture proof and which is provided with means adapted to render said tire resilient, said resilient means being adjustable to vary the amount of pressure exerted on the outer casing 4 and the tread 22, as desired. Furthermore novel means adapted to clamp the detachable tread securely in position on the outer casing have been provided, said means also tending to prevent skidding. It will be readily observed that in the event one or more of the spring clips 25 become worn through or otherwise rendered inoperative, others may be quickly sprung into position on the tread to take the place of the discarded ones. Furthermore, it is obvious that in the event one of the coiled springs housed within the barrels 8 becomes broken, its replacement may be easily effected by merely removing the plug at the end of the barrel in which such spring is located, withdrawing the broken spring and positioning a new one in its place. All this may be done without removing the tire or affecting it in any way.

It is obvious that various changes and modifications may be made in the construction herein illustrated without departing from the spirit of the invention and the right is therefore reserved to make such changes as fall within the scope of the appended claims.

Having thus described my invention, what I claim as new and desire to secure by Letters Patent of the United States is:—

1. A tire comprising a casing, a core positioned within said casing and being provided with a tongue, said casing being split around its outer circumference, means for clamping said tongue between the adjacent edges of said casing, and resilient means adapted to retain said core and said casing under predetermined pressure.

2. A spring clip adapted to clamp a detachable tread to the outer circumference of the tire casing comprising longitudinal and transverse bars, said transverse bars being adapted to exert an inwardly directed pressure on said longitudinal bars when said clip is sprung into position to hold said tread in firm frictional engagement with said casing.

3. A tire comprising a casing, an inner core and an outer tread member, said core and said tread member each being provided with a tongue, said casing being split around its outer circumference and means for clamping said tongues between the adjacent edges of said casing.

4. A tire for motor vehicles comprising a casing split around its outer circumference, a tread member for said casing having a tongue adapted to project between the adjacent edges thereof, a plurality of spring clips adapted to firmly clamp said tongue between said edges and to hold said tread member securely in position.

5. A tire comprising a casing, an inner core and an outer tread member, said core and said tread member each being provided with a tongue, said casing being split around its outer circumference, means for clamping said tongues between the adjacent edges of said casing, and resilient means adapted to retain said core and said casing under predetermined pressure.

6. A tire comprising a casing, an inner core and an outer tread member, said core and said tread member each being provided with a tongue, said casing being split around its outer circumference, and spring clips adapted to clamp said tongues between the adjacent edges of said casing.

In witness whereof, I, hereunto subscribe my name this 29th day of May A. D., 1917.

WILLIAM L. HARVEY.

Copies of this patent may be obtained for five cents each, by addressing the "Commissioner of Patents, Washington, D. C."